(12) United States Patent
Fukuoka et al.

(10) Patent No.: US 6,759,160 B2
(45) Date of Patent: Jul. 6, 2004

(54) SILICON OXIDE POWDER AND MAKING METHOD

(75) Inventors: Hirofumi Fukuoka, Annaka (JP); Satoru Miyawaki, Annaka (JP); Kenji Oōka, Annaka (JP); Susumu Ueno, Annaka (JP); Mikio Aramata, Annaka (JP); Takeshi Fukuda, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 226 days.

(21) Appl. No.: 10/082,315

(22) Filed: Feb. 26, 2002

(65) Prior Publication Data

US 2002/0159941 A1 Oct. 31, 2002

(30) Foreign Application Priority Data

Feb. 28, 2001 (JP) ........................................ 2001-053903

(51) Int. Cl.[7] ........................ H01M 4/48; C01B 33/113
(52) U.S. Cl. ........................ 429/128; 423/335; 423/336; 423/337
(58) Field of Search ................................ 423/335, 336, 423/337; 429/128

(56) References Cited

U.S. PATENT DOCUMENTS

| | | | |
|---|---|---|---|
| 5,051,247 A | 9/1991 | Bokerman et al. | 423/342 |
| 5,834,378 A * | 11/1998 | Kurtz et al. | 438/694 |
| 2001/0012503 A1 | 8/2001 | Fukuoka et al. | 423/335 |
| 2003/0143834 A1 * | 7/2003 | Morisaki et al. | 438/622 |

FOREIGN PATENT DOCUMENTS

| | | |
|---|---|---|
| EP | 0 216 649 A | 4/1987 |
| EP | 0 406 000 A2 | 1/1991 |
| EP | 0 840 386 A | 5/1998 |
| EP | 0 840 386 A1 | 5/1998 |
| JP | 9-7638 A | 10/1997 |
| JP | 2001348656 A * | 12/2001 |

OTHER PUBLICATIONS

Database WPI, Section Ch, Week 200207 Derwent Publications Ltd., London, GB; AN 2002–051162 XP002201123& JP 2001 226112 A (Shinetsu Chem Ind Co Ltd), Aug. 21, 2001 *abstract*.

Database WPI, Section Ch, Week 200163 Derwent Publications Ltd., London, GB; AN 2001–560341 XP002201124 & JP 2001 158613 A (Denki Kagaku Kogyo KK), Jun. 12, 2001 *abstract*.

Database WPI, Section Ch, Week 200158 Derwent Publications Ltd., London, GB; An 2001–524965 XP002201125 & JP 2001 118568 A (Denki Kagaku Kogyo KK), Apr. 27, 2001 *abstract*.

Patent Abstracts of Japan, vol. 2000, No. 24, May 11, 2001 & JP 2001 185125 A (Denki Kagaku Kogyo KK), Jul. 6, 2001 *abstract*.

Patent Abstracts of Japan, vol. 2000, No. 24, May 11, 2001 & JP 2001 199716 A (Denki Kagaku Kogyo KK), Jul. 24, 2001 *abstract*.

Database CA Online! Chemical Abstracts Service, Columbus, Ohio, US; Eckert, Hans J. et al.: "Studies on silicon oxides" retrieved from STN database accession No. 86:46630 CA XP002201140 *abstract* & Wiss. Z., Tech. Hochsch., Karl–Marx Stadt (1976), 18(1), 103–12, 1976.

Fuglein, Ekkehard et al., "Formation of $Mg_2Si$ from Solid Silicon Monoxide, and Solid–State Comproportionation between $Mg_2Si$ and SiO", Chem. Mater, 1999, 11, pp. 865–866.

* cited by examiner

*Primary Examiner*—Ngoc-Yen Nguyen
(74) *Attorney, Agent, or Firm*—Birch, Stewart, Kolasch & Birch, LLP

(57) ABSTRACT

A silicon oxide powder represented by the formula: $SiO_x$ wherein $1.05 \leq x \leq 1.5$ and having a BET specific surface area of 5–300 $m^2/g$ is useful as a negative electrode material to construct a lithium ion secondary cell having a high capacity and improved cycle performance.

9 Claims, 1 Drawing Sheet

SILICON OXIDE POWDER AND MAKING METHOD

This invention relates to a silicon oxide powder for use as a negative electrode active material in lithium ion secondary cells, and a method for preparing the same.

BACKGROUND OF THE INVENTION

Silicon oxide represented by SiO is a well-know material. By taking advantage of its chemical activity, it is used, for example, in the synthesis of industrially useful alkylhalosilanes (Gary N. Bokerman et al., U.S. Pat. No. 5,051,247) and the direct synthesis of siloxanes (Peter L. Timms and William N. Rowlands, EPA 0406000A2 "Polysiloxane oils and process for their preparation"). It is also reported that magnesium silicide is prepared by reacting silicon oxide with magnesium at low temperatures (E. Fuglein and U. Schubert, Chem. Mater., 1999, 11, 865–866).

Meanwhile, JP-A 9-7638 corresponding to EP 840386A discloses that the use of SiOx as a negative electrode active material in lithium ion secondary cells facilitates occlusion and release of lithium ions. Silicon oxide is thus expected to find an extra application as the negative electrode active material in lithium ion secondary batteries.

The use of silicon oxide (SiOx) powder as the negative electrode material in lithium ion secondary cells leads to a drastically increased initial capacity, but poor cycle performance.

SUMMARY OF THE INVENTION

An object of the invention is to provide a silicon oxide powder which is used as the negative electrode material to construct a lithium ion secondary cell capable of maintaining a high capacity without detracting from cycle performance. Another object is to provide a method for preparing the silicon oxide powder.

We have found that when a silicon oxide powder of the formula: SiOx wherein x has a value within a certain range and having a certain specific surface area is used as the negative electrode material in a lithium ion secondary cell, the cell has a high capacity and excellent cycle performance. The conditions under which a silicon oxide powder of a specific composition having physical properties in the desired range can be prepared have been empirically established.

The invention provides a silicon oxide powder represented by the formula: SiOx wherein x is a number from 1.05 to 1.5 and having a BET specific surface area of 5 to 300 $m^2/g$.

According to another aspect of the invention, the silicon oxide powder is prepared by heating a raw material powder mixture containing at least a silicon dioxide powder in an inert gas atmosphere or in vacuum at a temperature of 1,100 to 1,600° C. to generate SiO gas, continuously or intermittently feeding oxygen gas to the SiO gas to form a gas mixture, and depositing the gas mixture on a surface of a cooled substrate.

BRIEF DESCRIPTION OF THE DRAWING

The only figure.

DESCRIPTION OF THE PREFERRED EMBODIMENT

Figure 1:
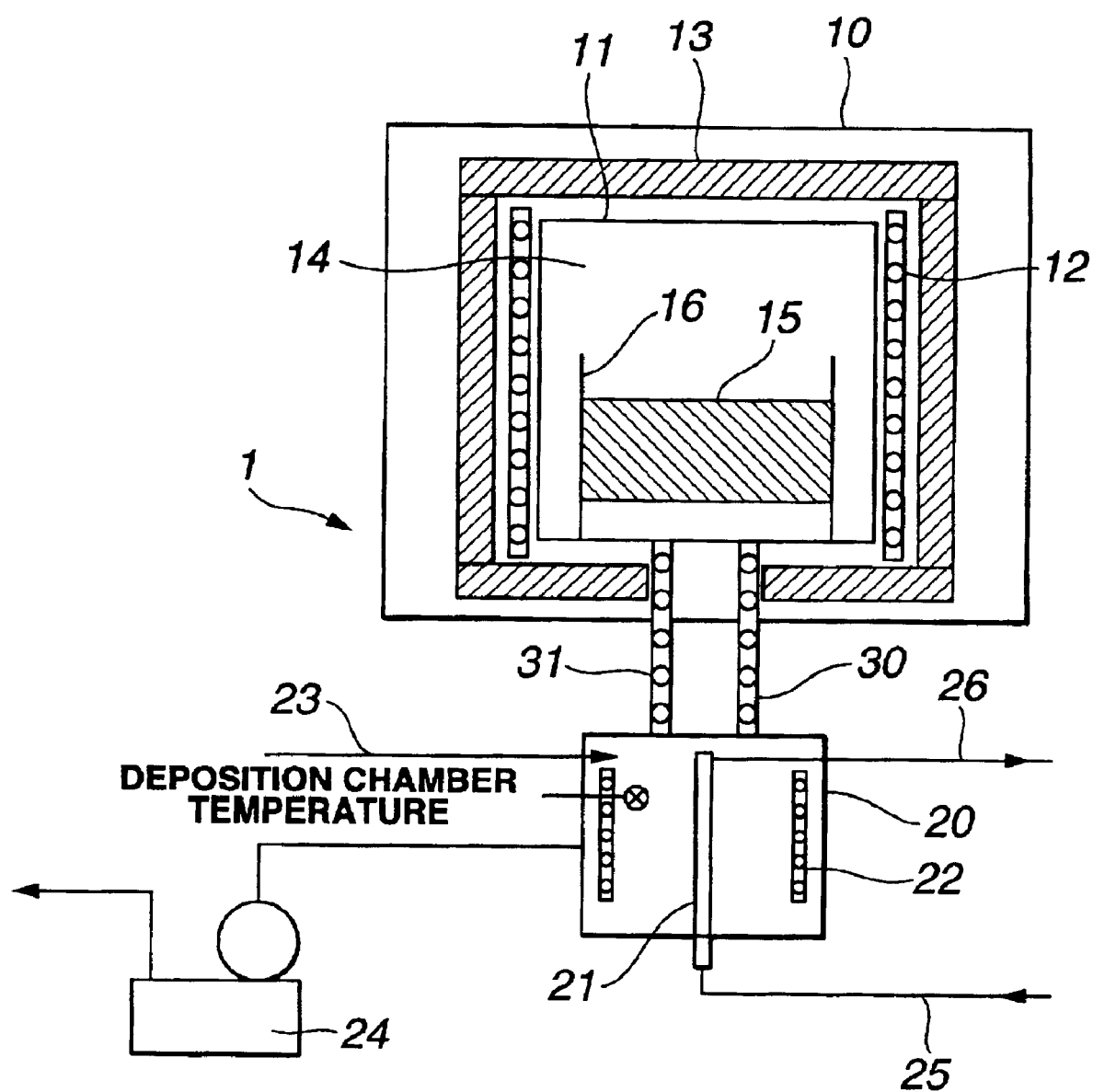
FIG. 1 is a schematic cross-sectional view of an apparatus for preparing silicon oxide according to one embodiment of the invention.

The silicon oxide powder of the invention is represented by the formula: SiOx wherein x is a number from 1.05 to 1.5 (i.e., $1.05 \leq x \leq 1.5$) and has a specific surface area of 5 to 300 $m^2/g$ as measured by the BET adsorption method.

When a silicon oxide powder of the formula: SiOx wherein x is less than 1.05 is used as the negative electrode material in a lithium ion secondary cell, the initial capacity of the cell is increased at the sacrifice of cycle performance. If x is more than 1.5, the cycle performance is improved at the sacrifice of charge-discharge capacity. Preferably x is between 1.1 and 1.3.

It is not well understood why the performance of a lithium ion secondary cell changes with the value of x in the formula: SiOx representative of the silicon oxide powder. It is presumed that as the x value that is the quantity of atomically dispersed oxygen increases, the silicon oxide is reduced in percent volume expansion upon occlusion of lithium ions. This restrains the disintegration and powdering of the negative electrode material by repetition of charge/discharge cycles. As a result, cycle performance is improved.

A BET surface area of less than 5 $m^2/g$ indicates that silicon oxide particles have a lower surface activity. When this silicon oxide powder is used as the negative electrode material in a lithium ion secondary cell, the amount of lithium ions migrating into and out of the silicon oxide powder is reduced and as a result, the charge/discharge capacity is reduced. If the BET surface area is more than 300 $m^2/g$, silicon oxide particles are so vulnerable to surface oxidation that the proportion of $SiO_2$ increases and hence, the value of x increases, resulting in a lowering of charge/discharge capacity. The preferred range of BET specific surface area is 10 to 200 $m^2/g$.

According to the invention, the silicon oxide powder defined above is prepared by heating a raw material powder mixture containing at least a silicon dioxide powder in an inert gas atmosphere or in vacuum at a temperature in the range of 1,100 to 1,600° C. to generate SiO gas, continuously or intermittently feeding oxygen gas to the SiO gas to form a gas mixture, and contacting the gas mixture with a surface of a cooled substrate for depositing silicon oxide particles thereon.

The raw material powder mixture containing a silicon dioxide powder is typically a mixture of silicon dioxide and a powder capable of reducing the silicon dioxide. Illustrative of the reducing powder are metallic silicon and carbon-containing powders. Of these, metallic silicon is preferred for increased reactivity and yields. The metallic silicon used herein is not critical although metallic silicon species of high purity such as semiconductor grade Si, ceramic grade Si and chemical grade Si are preferred because of the increased purity of the resultant silicon oxide powder. The mixing proportion of silicon dioxide and a reducing powder is determined as appropriate as long as complete reduction is ensured.

In a furnace, the mixture of silicon dioxide and a reducing powder is heated and maintained at a temperature in the range of 1,100 to 1,600° C., and preferably 1,200 to 1,500° C., for thereby generating SiO gas. At a heating temperature below 1,100° C., reaction proceeds with difficulty, resulting in a lower productivity. If the raw material powder mixture is heated above 1,600° C., the mixture melts and loses reactivity and a choice of the furnace material becomes a concern. The atmosphere within the furnace may be either an inert gas or vacuum although the reaction in vacuum is advantageous in that reactivity becomes higher on account of thermodynamics so that reaction can proceed at lower temperatures.

The SiO gas generated by heating the raw material powder mixture is then fed through a feed conduit to a deposition chamber for depositing a silicon oxide powder.

The feed conduit is preferably heated and maintained at a temperature of 1,000 to 1,300° C., more preferably 1,100 to 1,200° C. If the feed conduit is below 1,000° C., the SiO gas may deposit and build up on the inner wall of the conduit, which becomes a disturbance to operation, eventually retarding stable continuous operation. Heating the conduit above 1,300° C. achieves no additional effects and can invite an increase of power consumption.

While the SiO gas is carried to the deposition chamber, oxygen gas is fed thereto. The oxygen gas may be fed as such or an inert gas containing oxygen gas be fed. By controlling the flow rate and feed time of oxygen gas, the x value in the resulting silicon oxide powder (SiOx) can be adjusted. It is not critical how to feed the oxygen gas, and the oxygen gas may be fed continuously or intermittently or otherwise. Any appropriate oxygen gas feed method may be selected in accordance with a particular purpose. When oxygen gas is fed to and mixed with SiO gas, the temperature is preferably 800 to 1,200° C., and especially 900 to 1,100° C.

A gas mixture obtained by feeding oxygen gas to SiO gas is contacted with a surface of a substrate which is disposed within the deposition chamber and cooled with a coolant whereby a silicon oxide powder (SiOx) having a predetermined value of x deposits on the substrate. The temperature of the substrate at the surface is, though not critical, preferably 200 to 400° C. At a substrate surface temperature below 200° C., the resulting silicon oxide powder may have a BET specific surface area in excess of 300 $m^2/g$ and a lower purity. On the other hand, at a substrate surface temperature above 400° C., the resulting silicon oxide powder may have a BET specific surface area of less than 5 $m^2/g$ and a lower activity.

The coolant for cooling the substrate is, though not critical, selected from liquids such as water and heat transfer media and gases such as air and nitrogen gas. The type of the substrate is not critical although the use of high-melting metals such as stainless steel, molybdenum and tungsten is preferred for ease of working.

It is not well understood why the BET specific surface area of silicon oxide powder changes with the substrate surface temperature. As the substrate surface temperature becomes higher, deposits become sufficiently active on their surface to fuse them together for consolidation, leading to a lowering of BET specific surface area.

The silicon oxide powder thus deposited on the substrate is recovered by a suitable means such as a scraper. After recovery, the silicon oxide powder is pulverized to a desired particle size in a suitable means such as a ball mill, if necessary.

Now an apparatus for use in the practice of the inventive method for producing a silicon oxide powder is described. Referring to FIG. 1, there is illustrated an apparatus according to one embodiment of the invention, generally designated at 1. The apparatus 1 includes a reaction furnace 10 and a deposition chamber 20 which are interconnected by a transfer conduit 30 having a heater 31 built therein. Disposed in the reaction furnace 10 is a muffle 11 which is surrounded by a heater 12. A heat insulator 13 is disposed around the heater 12.

The muffle 11 defines a reaction chamber 14 therein. Disposed within the reaction chamber 14 is a container 16 for receiving a raw material powder mixture 15 containing a silicon dioxide powder. The heater 12 is operable to heat the raw material powder mixture 15 in the container 16 at a predetermined temperature to thereby generate a silicon oxide gas which is then fed into the deposition chamber 20 through the transfer conduit 30 connected to the muffle 11.

Disposed in the deposition chamber 20 are a substrate 21 and a heater 22 for heating the interior of the chamber 20.

Connected to the deposition chamber 20 are a gas inlet tube 23 for feeding oxygen gas into the chamber 20 and a vacuum pump 24 for evacuating and maintaining in vacuum the interior of the apparatus.

The substrate 21 is provided in its interior with coolant channels (not shown) to which a coolant inlet tube 25 and a coolant outlet tube 26 are connected.

The silicon oxide gas which has been introduced into the deposition chamber 20 through the feed conduit 30 is mixed with oxygen gas from the inlet tube 23 and brought in contact with the surface of the cooled substrate 21 whereby it is cooled and deposited as silicon oxide particles.

EXAMPLE

Examples of the invention are given below by way of illustration and not by way of limitation.

Example 1

Using the apparatus 1 shown in FIG. 1, a silicon oxide SiOx powder was prepared. The raw material powder mixture 15 used was an equimolar mixture of a silicon dioxide powder (BET surface area 200 $m^2/g$) and a metallic silicon powder of the ceramic grade (BET surface area 4 $m^2/g$).

First, 200 g of the raw material powder mixture 15 was placed in the reaction furnace 10 whose muffle 11 had a volume of 6,000 $cm^3$. The vacuum pump 24 was operated to evacuate the reaction furnace 10 to a vacuum of 0.1 Torr or lower. The heater 12 was actuated to heat and maintain the container at a temperature of 1,350° C. With the heater 31 on, the transfer conduit 30 was heated and maintained at a temperature of 1,100° C. The heater 22 in the deposition chamber 20 was then actuated to heat the chamber 20 at a temperature of 900° C. At the same time, water was flowed at a rate of 5.0 NL/min through the channels in the stainless steel substrate 21 having a surface area of 200 $cm^2$ to maintain the substrate surface at a temperature of about 280° C. An argon gas containing 20% of oxygen gas was continuously fed at a rate of 50 cc/min from the gas inlet tube 23 into the deposition chamber 20.

Under these conditions, operation was continued for 5 hours, after which 160 g of SiOx in a black mass form deposited on the surface of the substrate 21. The mass deposit was recovered and pulverized for 5 hours in a ball mill, obtaining a silicon oxide powder. This silicon oxide powder was an amorphous powder having a BET specific surface area of 210 $m^2/g$ and represented by the formula: SiOx wherein x is 1.22.

Next, 100 parts by weight of the silicon oxide powder thus obtained, 90 parts by weight of graphite as a conductive agent, and 20 parts by weight of polyvinylidene fluoride as a binder were kneaded together (in N-methylpyrrolidone solvent). A portion of this compound was applied to a stainless steel mesh, bonded thereto under pressure, and dried at 120° C. overnight in a vacuum dryer, obtaining an electrode containing silicon oxide. The preparation conditions and the physical properties of silicon oxide are shown in Table 1.

The charge/discharge performance of the electrode was examined. A lithium ion secondary cell for the rating of the electrode was constructed using a lithium foil as the counter electrode. The nonaqueous electrolyte used was a nonaqueous electrolyte solution of lithium phosphorus hexafluoride in a 1/1 mixture of ethylene carbonate and 1,2-dimethoxyethane in a concentration of 1 mol/liter. The separator used was a microporous polyethylene film of 30 µm thick.

The lithium ion secondary cell thus constructed was allowed to stand overnight at room temperature. Using a secondary cell charge/discharge tester (Nagano K.K.), a charge/discharge test was carried out on the cell 10 cycles under conditions including a constant current density of 0.5 mA/cm$^2$, a discharge termination voltage of 0.003 V and a charge termination voltage 1.800 V. The results are shown in Table 2.

Examples 2 to 4

Silicon oxide powders represented by the formula: SiOx were prepared as in Example 1 except that the temperature within the deposition chamber 20, the flow rate of water through the substrate 21, and the flow rate of 20% oxygen-containing argon gas were changed as shown in Table 1.

Using the silicon oxide powders thus obtained, a charge/discharge test was carried out as in Example 1. The results of the charge/discharge test are shown in Table 2.

Comparative Examples 1 to 4

Silicon oxide powders represented by the formula: SiOx were prepared as in Example 1 except that the temperature within the deposition chamber 20, the flow rate of water through the substrate 21, and the flow rate of 20% oxygen-containing argon gas were changed as shown in Table 1.

Using the silicon oxide powders thus obtained, a charge/discharge test was carried out as in Example 1. The results of the charge/discharge test are shown in Table 2.

TABLE 1

|  | SiOx preparing conditions | | | | SiOx | |
| --- | --- | --- | --- | --- | --- | --- |
|  | Deposition chamber temp (° C.) | Water flow rate (NL/min) | Ar+20%O$_2$ flow rate (cc/min) | Substrate surface temp. (° C.) | x | BET surface area (m$^2$/g) |
| Example 1 | 900 | 5.0 | 50 | 280 | 1.22 | 210 |
| Example 2 | 900 | 5.0 | 200 | 280 | 1.45 | 200 |
| Example 3 | 800 | 7.0 | 50 | 210 | 1.32 | 280 |
| Example 4 | 1000 | 5.0 | 50 | 360 | 1.15 | 35 |
| Comparative Example 1 | 900 | 5.0 | 0 | 280 | 1.01 | 210 |
| Comparative Example 2 | 900 | 5.0 | 300 | 280 | 1.65 | 230 |
| Comparative Example 3 | 700 | 7.0 | 50 | 160 | 1.30 | 350 |
| Comparative Example 4 | 1050 | 5.0 | 50 | 420 | 1.10 | 3 |

TABLE 2

|  | Initial charge/discharge | | | 10th charge/discharge | | |
| --- | --- | --- | --- | --- | --- | --- |
|  | Charge capacity (mAh/g) | Discharge capacity (mAh/g) | Capacity loss (%) | Charge capacity (mAh/g) | Discharge capacity (mAh/g) | Discharge retentivity (%) |
| Example 1 | 1150 | 742 | 35 | 570 | 566 | 76 |
| Example 2 | 1010 | 720 | 29 | 560 | 557 | 77 |
| Example 3 | 1045 | 810 | 22 | 577 | 570 | 70 |
| Example 4 | 1180 | 780 | 34 | 590 | 583 | 75 |
| Comparative Example 1 | 1320 | 610 | 53.8 | 235 | 222 | 36 |
| Comparative Example 2 | 400 | 315 | 21 | 260 | 255 | 81 |
| Comparative Example 3 | 312 | 240 | 23 | 190 | 185 | 77 |
| Comparative Example 4 | 420 | 310 | 26 | 240 | 235 | 76 |

There has been described a silicon oxide powder having the formula: SiOx wherein x is controlled in a specific range, which is used as a negative electrode material to construct a lithium ion secondary cell having a high capacity and improved cycle performance. The silicon oxide powder can be produced on an industrially acceptable scale.

Japanese Patent Application No. 2001-053903 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicon oxide powder represented by the formula: SiOx, wherein x is from 1.05 to 1.5 and having a BET specific surface area of 5 to 300 m$^2$/g.

2. A method for preparing the silicon oxide powder of claim 1, comprising the steps of:
   heating a raw material powder mixture containing at least a silicon dioxide powder in an inert gas atmosphere or in vacuum at a temperature of 1,100 to 1,600° C. to generate SiO gas,
   continuously or intermittently feeding oxygen gas to the SiO gas to form a gas mixture, and depositing the gas mixture on a surface of a cooled substrate.

3. The method of claim 2, wherein the depositing step includes cooling the substrate surface at a temperature of 200 to 400° C.

4. A lithium ion secondary cell comprising a negative electrode, which contains the silicon oxide powder of claim 1.

5. The silicon oxide powder of claim 1, wherein x is from 1.1 to 1.3.

6. The silicon oxide powder of claim 1, having a BET specific surface area of 10 to 200 $m^2/g$.

7. The method of claim 2, wherein said heating step is performed at a temperature of 1,200 to 1,500° C.

8. The method of claim 2, wherein said oxygen gas is fed continuously to the SiO gas to form said gas mixture.

9. The method of claim 2, wherein said oxygen gas is fed intermittently to the SiO gas to form said gas mixture.

* * * * *